Figure 2B:
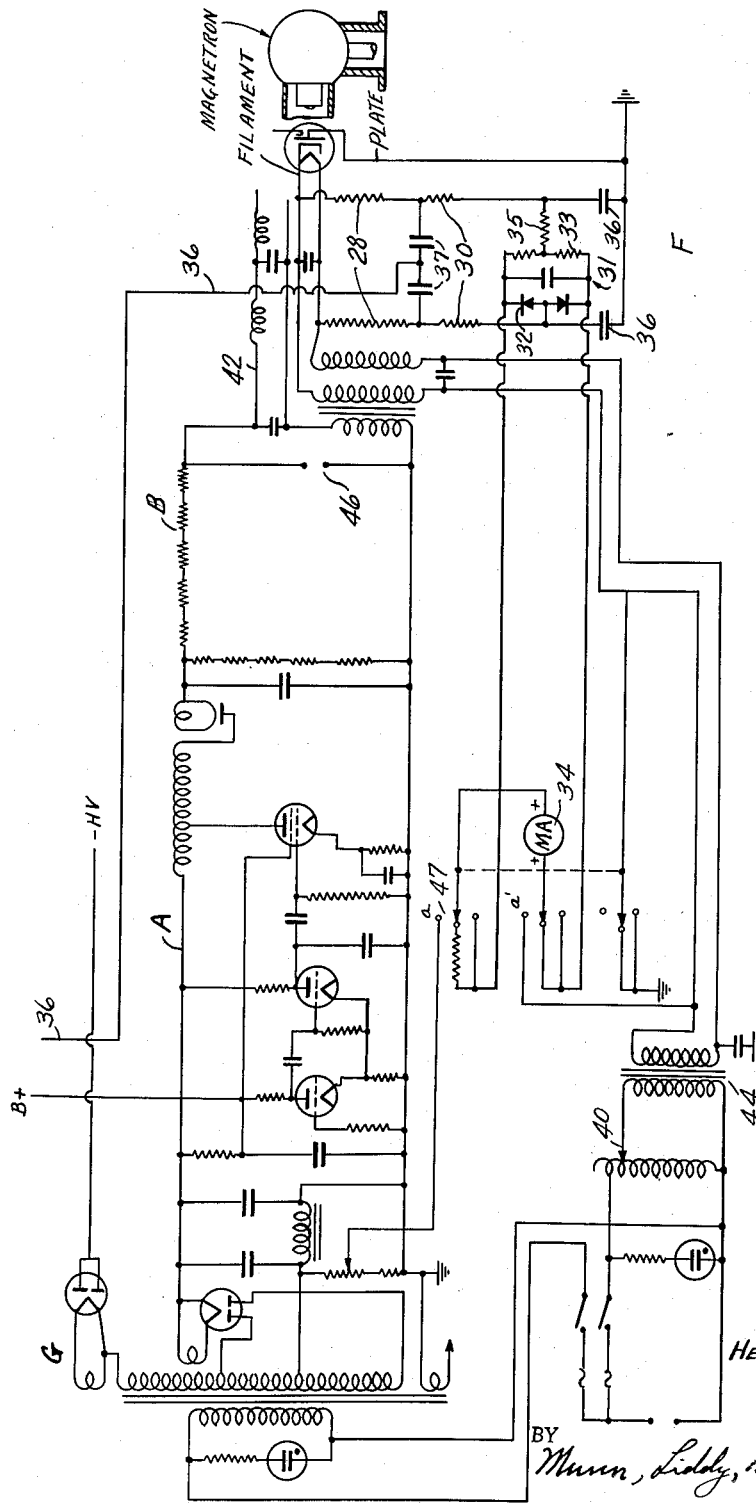

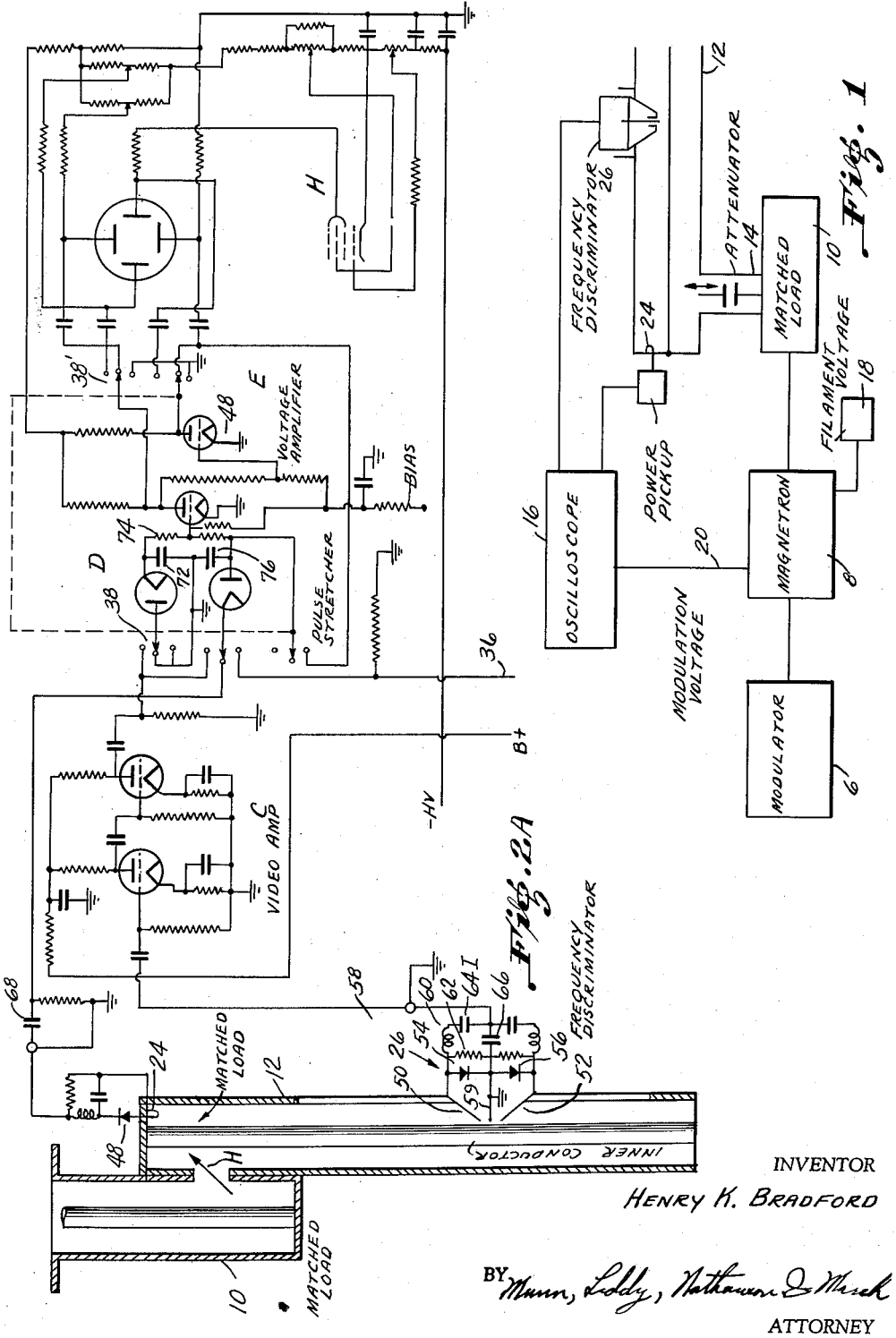

Jan. 10, 1961 H. K. BRADFORD 2,967,996
MAGNETRON TESTER
Filed April 25, 1955 2 Sheets-Sheet 2

INVENTOR
HENRY K. BRADFORD
BY Munn, Liddy, Nathanson & Marsh
ATTORNEY

United States Patent Office 2,967,996
Patented Jan. 10, 1961

2,967,996

MAGNETRON TESTER

Henry K. Bradford, Falls Church, Va., assignor to U.S. Electronics Corporation, Alexandria, Va., a corporation of Delaware Filed Apr. 25, 1955, Ser. No. 503,723

6 Claims. (Cl. 324—58)

This invention relates to test equipment for ultra high frequency devices and in particular to magnetron testing apparatus.

An object of this invention is to provide testing apparatus for detecting and indicating values of tube characteristics of a magnetron in a satisfactory and practical manner.

A further object of this invention is to provide direct reading instrumentation for indicating the characteristics of a magnetron.

Another object of the invention is to provide an instrument for giving visual indication of the characteristics of a magnetron.

Pulsed magnetron oscillators are operable for periods on an order of 2 microseconds and their average operating time is low. For example: a magnetron may be pulsed for .002 second per second (one thousand two microsecond pulses per second). The pulse duration cannot be raised for test purposes since this would damage the tube.

So far as is known to me there is no known field test equipment for evaluating magnetrons. Of course the equipment with which the magnetron is used can obviously be used in testing it. Thus, if the equipment appears to function properly in accordance with predetermined data, the magnetron is assumed to be operating properly. This is a time consuming procedure and is also obviously not satisfactory. If the equipment does not function properly the difficulty in locating the faulty components is increased when it is realized that the oscillator cannot be tested separate from its associated circuit components. Therefore, in order to remedy this situation one of the objects of this invention is to provide a testing device which will test magnetrons in the field. It will be no longer necessary to run the more complex and involved testing procedures heretofore used. The testing apparatus constructed in accordance with my invention results in a method of testing magnetrons which is similar to the methods of testing lower frequency lower power conventional electronic tubes or valves.

According to my invention I reduce the average power output of the magnetron and thus reduce the power supply requirements. However, the output per pulse must be maintained. Thus the power requirements are reduced, but the problem of detecting and indicating the characteristics are increased due to the fact that the pulse rate is reduced. According to my invention the magnetrons being tested are pulse modulated at only a few pulses per second, for example, one or two pulses per second. Obviously the average input power can, therefore, be made very small and compatible with portable field equipment. One of the objects of the invention is to provide testing equipment for magnetrons for indicating the characteristics thereof when the magnetron is pulsed at a very low pulse rate.

One of the characteristics of a high frequency device which is of importance is the power output. A further object, therefore, is to provide a satisfactory means of indicating the power output of a magnetron. Another important characteristic is the frequency of oscillations, and accordingly yet another object of the invention is to provide a satisfactory means of measuring and indicating the frequency of the magnetron.

Yet a further object of the invention is to provide a probe for use in obtaining visual indication of the frequency of a high frequency oscillator such as a magnetron.

As indicated above it is important to have the proper pulse voltage for a device such as a magnetron. Further, it is important that the filament voltage that is supplied to the magnetron be correct. One of the objects of the invention is accordingly to provide a means for indicating the pulsing voltage. Yet another object of the invention is to provide a means for monitoring the filament voltage. The filament voltage is monitored by means of a circuit arrangement described hereinafter.

It is also an object of the invention to provide a movable probe measuring device in a slotted line with which direct reading of frequency can be obtained without tedious adjustment of the device. No mechanical adjustments of the probe device along the slotted line are necessary according to my invention except in setting a basic or reference frequency or wave length against which the magnetron may be compared or referred.

These and other objects and advantages will become apparent from the following description and the accompanying drawings in which:

Figure 1 is a diagrammatic representation of a testing device constructed in accordance with the invention.

Figure 2–A is a schematic representation of a portion of the circuit of a testing device constructed in accordance with the invention.

Figure 2–B is a schematic representation of the remaining portion of the circuit illustrated in Fig. 2–A.

Referring now particularly to the drawings Figure 1 serves to illustrate the simplicity of the testing apparatus. The testing equipment comprises a modulator 6 for driving the magnetron 8. The magnetron output is fed to a matched load 10. The output is connected to a slotted line section 12 through attenuator 14. The oscilloscope 16 has associated therewith power and frequency probes or pick-ups in the slotted line. Modulation voltage can also be fed from the magnetron into the oscilloscope. A meter 18 can be used to monitor the filament voltage, whereas the output through line 20 monitors the pulse voltage. The oscilloscope is associated with suitable amplifiers and switching means for reading a selected one of the inputs from the two pick-ups. The equipment is extremely compact and in fact in the actual embodiment forms a handy portable instrument.

A circuit constructed in accordance with the invention is illustrated in Figs. 2–A and 2–B. Here again, the simplicity of the apparatus is apparent. The following is a general description of the circuit:

Figure 2 shows the modulator system for the magnetron as comprising a free running multi-vibrator and driver A and a spark gap modulator circuit B. The output of the spark gap modulator B is transformer coupled to the magnetron. The output of the magnetron is fed from the matched line 10 to the slotted line section 12 by attenuator 14 which is shown as variable. A power pick-up probe 24 is placed within line 12 at the matched end thereof. A frequency pick-up probe device or discriminator 26 is placed at the quarter or three-quarter or any odd quarter wave length spacing from the open end of line 12. The outputs from probe 24 and discriminator 26 are fed to the oscilloscope. The oscilloscope includes video amplifier C, pulse stretcher D and voltage amplifier phase-inverter E.

The filament voltage of the magnetron, as appearing between transformer 44 and the magnetron is read through the balanced divider legs 28 and 30 of circuit F. The voltage is measured through the bridge circuit 31. Rectifiers 32 constitute two legs of the bridge and resistances 33 the other two. Meter 34 measures filament voltage. The A.C. filament voltage is impressed through arms 28 and 30. The latter act as voltage multipliers for the meter as also does resistor 35. The impressed voltage is rectified for measurement by the D.C. meter. The filter condensers 36 will by-pass any pulse energy that may be impressed on the paths 28 and 30 in parallel. Meter 34 is calibrated for the fraction of A.-C. voltage provided by the divider.

Measurement of the modulation or pulse peak voltage on the magnetron filament is obtained through power divider circuit F (resistors 28 and 30). Lead 36 is connected to both of the power divider legs of circuit F through coupling capacitors 37 and feeds the pulse voltage to the oscilloscope. No A.C. filament voltage will appear in lead 36. Switch 38 provides means of switching from one input to the other. It is noted that the input from the frequency discriminator is fed through video amplifier C, whereas input from the power pick-up and the magnetron pulsing voltage is fed to the pulse stretcher directly.

Power supply is furnished by sections G and H. These supply the plate voltages for the various components. The filament voltage for the magnetron is supplied by the variable auto-transformer 40.

Meter 34 monitors the filament voltage supplied by the variable auto-transformer. Switch 47 makes it possible to use meter 34 as an ammeter for measuring the "diode" current of the magnetron. When switched to a, a' the current can be measured.

Figures 2–A and 2–B illustrate an actual working embodiment of the invention. In the high voltage supply the multivibrator drives a power amplifier which charges the delay network 42. The latter can be an open ended line having a 2 microsecond delay. The magnetron filament is inductively coupled with the network by transformer 44 whose primary is in series with the network. Discharge of the network is accomplished with spark gap 46. A manually adjustable gap is used.

No sweep voltage is applied to the oscilloscope. One set of plates carries no A.-C. voltage and the indications on the other set will consist of straight trace lines. These trace lines are vertical in the case of modulation voltage and power indications, and horizontal in the case of frequency indications. (Switch 38 includes contacts 38' for switching deflection plate leads.) The pulse stretcher holds the readings at peak level for a sufficient length of time to be read easily. There is relatively long exponential decay of the initial deflection in the circuit illustrated.

Probe 24 is the power pick-up probe. An induction probe is used in association with the diode crystal 48. The probe is designed so as not to be frequency discriminative. Further when the probe is positioned at the attenuator output (at the closed end of the slotted line which is actually a matched section (end) of the line) the voltage standing wave ratio is low and the induction probe will receive a known portion of the power in the line. In other words, with the probe positioned to the rear of the attenuator and directly receiving the attenuator output the sampling will be a direct proportional sampling of the magnetron output.

The crystal used will be tested for its sensitivity and efficiency at the R-F range at which it will be used. A selected crystal will then be calibrated by feeding a known output such as a saw tooth wave into the load. This output will be amplified a fixed amount by the voltage amplifier and phase inverter and pulse stretcher circuits. The vertical deflection of the oscilloscope will then be in accordance with the output of the crystal. At high levels of the crystal output the deflection will be a linear function of the voltage output. Assuming a constant impedance of the circuit and fixed known attenuation the cathode ray tube may be marked directly in power in the form of a voltage squared scale.

As stated heretofore the frequency discriminator, or probe 26, is placed at an odd quarter-wave length spacing from the open end of the slotted line. This will be at a voltage node point. The discriminator or probe actually comprises a pair of matched probes 50, 52 feeding two matched crystal rectifiers 54 and 56 respectively. The rectifiers feed pulses to the sampling lead 58 in opposing phase. Each of the rectifiers is shunted by an R-F filter network composed of inductor 60 and resistor 62 and capacitor 64 with the resistor being in parallel with the capacitor and inductor which are in series. The parallel legs of each of the networks is bridged across capacitor 66 in the sampling line. The probe 59 shields the pick-up probes and is grounded to the outer conductor. Probes 50—52 are adjustable with respect to probe 59.

If probes 50 and 52 are positioned exactly symmetrically with respect to the voltage node, there will be no net output. One probe will have a negative output and the other a positive output of the same value, and one output will cancel the other. The probe device is movable along the line, and the position of the discriminator is preset at an odd quarter wave length spacing corresponding to a specified frequency judged to be near that of the magnetron under test. It is preadjusted by varying the penetration of the probes to compensate for any inequality of the crystals.

If the probes are exactly symmetrical with respect to the voltage node there will be no net output as the positive voltage of one will cancel the negative voltage of the other. However, if the frequency changes, or is other than that picked by the original setting, the voltage node along the slotted line will correspondingly shift and a net output will result. One probe will be located nearer the node while the other will be located farther away from it. Moreover, the probe output will be of one polarity when the probe assembly is located to one side of the node and of the opposite polarity when the probe is on the other side of the node.

If these net outputs at either side of the node are amplified, the voltage-frequency slope characteristic of the pulse amplitudes is increased and very near the node there will be a nearly linear relationship between the voltage produced and the frequency deviation from reference. Now if the power input is held constant and the Q of the slotted line is constant, the frequency will be a function of the output voltage.

This net voltage is amplified by the video amplifier and then is fed into the pulse stretcher and the phase inverter amplifier.

The sentitivity of the entire arrangement is set for a deflection representing 100 mc. per cm. on the screen of the cathode ray tube by means of the gain of the amplifiers. Positive pulses in the sampling lead 58 will emerge from the video amplifier C as amplified positive pulses and will cause conduction in the half of the double diode pulse stretcher to which the plate is connected. Thus condenser 72 will receive a positive charge and this will raise the grid potential of the input grid of the voltage amplifier-phase inverter through resistor 74. Since resistor 74 is large this potential will remain on the grid long after the pulse has disappeared from the diode plate. Negative pulses amplified similarly will cause conduction in the other half of the double diode causing condenser 76 to become negative at the diode plate connection and remain so after the pulse is gone. This will drive the grid of the voltage amplifier-phase inverter negative and produce opposite cathode ray beam deflection.

It is possible to get an accurate frequency reading from a single 1 microsecond pulse of R-F energy of a magnetron with the instrument disclosed herein.

From the foregoing description it will be seen that I have devised a portable testing apparatus for field testing magnetrons. Both probe 24 and discriminator 26 put out video voltages which can be amplified and read on the oscilloscope.

While I have shown and described a preferred form of my invention, it will be understood that variations in detail of form may be made without departure from the invention as defined in the appended claims.

I claim:

1. Electronic test equipment for testing an oscillator comprising a power supply, means coupling said supply to said oscillator, a matched load for said oscillator, means for coupling said oscillator to said load, an open ended slotted line test section, means for coupling said test section to said load comprising an attenuator, a frequency discriminating probe device positioned at an odd quarter-wave length spacing with respect to a standing wave on said slotted line for the approximate frequency of said oscillator, and an instrument for indicating the output of said probe device connected to said probe device, said instrument being calibrated in frequency for direct reading of the frequency of said oscillator.

2. The apparatus of claim 1 in which said probe device comprises a pair of matched probes and a center probe with each of said pair of probes being in series with a rectifier, each of said rectifiers being connected to said center probe with one rectifier being in opposition with respect to the other rectifier.

3. The apparatus of claim 1 in which a second probe device is positioned in said line and said second probe is non-frequency discriminative, a rectifier in series with said second probe, means for connecting said second probe to said instrument and means for switching said instrument from said second probe device to the first mentioned probe device.

4. In combination with a magnetron oscillator, means for modulating said oscillator, a matched load connected to said oscillator, an open ended slotted test line comprising a coaxial line, means for inducing a portion of the output in said matched load into said slotted line comprising an attenuator, a frequency discriminating probe device positioned in said slotted line at an odd quarter wave length spacing with respect to a standing wave in said line, said probe device comprising a video sampling lead and a center probe in series with said lead at said quarter wave length spacing and two matched probes positioned on opposite sides of said center probe, each of said matched probes having a rectifier associated therewith and the outputs of said rectifiers being connected to said sampling line with the output of one of said rectifiers being in opposite phase with the output of the other of said rectifiers, said probes being adjusted to be symmetrically disposed with respect to a node point in a standing wave in said slotted line so that the outputs to said sampling lead from said rectifiers cancel, an oscilloscope, said oscilloscope including a pulse stretcher circuit, the output from said sampling lead being in the form of pulses, said pulse stretcher circuit output being fed to a pair of plates of said oscilloscope and said pulse stretcher circuit holding the peaks of said pulse on said oscilloscope.

5. The apparatus of claim 4 including means for measuring the modulation voltage on said oscillator including a voltage divider connected to said filament leads, a second sampling lead connected to said voltage divider and means for alternately connecting said second sampling lead or the first mentioned sampling lead to said pulse stretcher circuit.

6. In combination with a magnetron oscillator, means for modulating said oscillator, a matched load connected to said oscillator and comprising an open ended slotted test line comprising a coaxial line, means for inducing a direct proportion of the output of said oscillator in said matched load into said slotted line comprising an attenuator, an inductor probe positioned in said slotted line adjacent the end remote from the open end, a rectifier in series with said probe for rectifying the current picked up thereby, and an oscilloscope, means connecting the output from said rectifier to said oscilloscope, said oscilloscope including a pulse stretching circuit adapted to receive pulsed output from said rectifier, the output from said pulse stretching circuit being fed to one of the pair of plates of said oscilloscope, said pulse stretching circuit being adapted to retain the peaks of the pulses received from said crystal as visual indications on said oscilloscope.

References Cited in the file of this patent

UNITED STATES PATENTS

| | | |
|---|---|---|
| 2,416,322 | Kellogg | Feb. 25, 1947 |
| 2,431,941 | Kihn | Dec. 2, 1947 |
| 2,440,287 | Oravetz | Apr. 27, 1948 |
| 2,458,814 | Warren | Jan. 11, 1949 |
| 2,630,475 | Woodward | Mar. 3, 1953 |
| 2,724,800 | Hansen et al. | Nov. 22, 1955 |
| 2,776,406 | Cohn et al. | Jan. 1, 1957 |
| 2,788,490 | Nowogrodski et al. | Apr. 9, 1957 |
| 2,790,142 | Guthrie | Apr. 23, 1957 |

FOREIGN PATENTS

| | | |
|---|---|---|
| S28911 | Germany | Dec. 1, 1955 |